United States Patent [19]

Kato et al.

[11] Patent Number: 4,571,715
[45] Date of Patent: Feb. 18, 1986

[54] OPTICAL HEAD MOVABLE IN A TRACKING DIRECTION

[75] Inventors: Kikuji Kato, Tokorozawashi; Akinori Watabe, Yokohamashi; Hiroo Ukita, Kodairashi; Susumu Yonezawa, Yokosukashi, all of Japan

[73] Assignee: Nippon Telegraph & Telephone Public Corporation, Tokyo, Japan

[21] Appl. No.: 468,680

[22] Filed: Feb. 22, 1983

[30] Foreign Application Priority Data

Feb. 22, 1982 [JP] Japan ............................ 57-26156
Apr. 5, 1982 [JP] Japan ............................ 57-56192

[51] Int. Cl.⁴ ........................................ G11B 7/08
[52] U.S. Cl. ................................ 369/45; 250/201
[58] Field of Search .............. 369/44, 45, 46, 112; 250/201 DF; 350/247, 252, 255

[56] References Cited

U.S. PATENT DOCUMENTS

| | | | |
|---|---|---|---|
| 4,437,177 | 3/1984 | Watabe et al. | 369/44 |
| 4,458,980 | 7/1984 | Ohki et al. | 369/103 |
| 4,472,024 | 9/1984 | Konomura et al. | 350/247 |

FOREIGN PATENT DOCUMENTS

56-80834  2/1981  Japan .............................. 369/45

*Primary Examiner*—Robert L. Richardson
*Attorney, Agent, or Firm*—Cushman, Darby & Cushman

[57] ABSTRACT

An optical head for use with an optical disk has a unit packaging an optical path conversion device for converting a light beam path from substantially in parallel to the surface of a rotating optical disk into a direction substantially perpendicular to the surface of the optical disk, a lens system for focusing the light beam onto the recording surface of the optical disk, and a focus controlling mechanism for adjusting the focus of the lens system. A head outer shell supports the unit by one or more diaphragms for movement of the unit in the parallel direction of the optical path. A track control mechanism which includes an electromagnetic actuator adjusts the positional relation of the unit relative to outer shell in that parallel direction without causing unit movement in the perpendicular direction.

7 Claims, 21 Drawing Figures

OPTICAL HEAD MOVABLE IN A TRACKING DIRECTION

FIELD OF INVENTION

The present invention relates to an improvement in an optical head for recording or reproducing data via optical information recording equipment which is capable of irradiating a light beam onto an optical disk, or a medium for recording information, or of converging the light reflected therefrom. More particularly, it relates to an optical head which is capable of high speed and high precision control and is thin and compact in configuration.

BACKGROUND OF THE INVENTION

An optical head for recording or reproducing information on the information recording surface of an optical disk rotating at a high speed requires a focus control mechanism for correctly focusing the light beam on the information recording surface of the optical disk and a tracking control mechanism for correctly following the track on the information recording surface of the optical disk. Heretofore, there have been known optical heads of such construction as disclosed in:
 (1) Japn. Pat. Appl. No. 54-145462 laid open June 6, 1981 as No. 56-68936
 (2) Japn. Pat. Appl. No. 55-149733 laid open May 11, 1982 as No. 57-74839
 (3) T. Musa et al: OPTICAL HEAD FOR DIGITAL AUDIO DISKS, SPIE. VOl. 329 Optical Disk Technology (1982)

Such a conventional optical head unit is packaged with an optical path conversion means such as a mirror or a prism for converting the direction of the light beam from parallel to perpendicular to the surface of said optical disk and a mechanism for controlling the focusing. The unit is contained in an outer shell in a manner so as to be movable relative to the direction of the optical path of the light beam, and a track controlling mechanism is interposed between the outer shell and the unit.

The mechanisms for focus and track controlling respectively include an electromagnetic actuator and are capable of high speed and high precision control by means of an electric signal supplied from outside the optical head according to the rotation of the optical disk.

Of the two mechanisms, the track control mechanism performs its function by causing minute mechanical displacement to the unit as a whole which is fairly heavy as it packages said mirror, prism and the like as the optical path converting means and a mechanism for focus control. Such control should be correctly oriented to the direction of the optical path of the light beam. In case any displacement element in the direction other than said direction should occur, the track controlling and the focus controlling would affect each other to impair correct controlling.

The inventors have made elaborate studies and research on the track control mechanism and noted the following phenomenon. Since the conventional mechanisms are structured with an elastic material such as rubber interposed between the unit and the outer shell which contains the unit, it was found that upon mechanically displacing the unit relative to its outer shell, the elastic material would deform in directions other than that of the displacement. As a result, the displacement of the unit would slightly deviate from the direction of the light beam. Thus, attempting to control the track would cause an adverse effect on the focus control and complicate the controlling operations.

Further, optical disk recording equipments with plural disks in multi-layers instead of packaging with a single optical disk have been developed to thereby increase the recording capacity. In this case the optical head would be inserted in the interval of each optical disk in multi-layers and it would be necessary to construct the optical head as thin as possible in the outer configuration so that the space factor in the optical disk recording equipment can be improved.

Moreover, in the conventional equipment, the actuators for the focus control mechanism packaged in the unit are disposed behind the optical path conversion means in cascade. This was defective as the optical head would become thicker as a whole by the thickness of the actuators.

OBJECT OF THE INVENTION

An object of the present invention is to provide an optical head which is capable of track control without affecting the focus control.

Another object of the present invention is to provide an optical head whose displacement which occurs during the track control by means of the actuators is limited to the components of desirable direction.

Still another object of the present invention is to provide an elastic member of a novel structure for supporting the unit which is the object of the track control.

Still another object of the present invention is to provide an optical head which will cause no resonance of a high frequency on the mechanical displacement when track control is performed by the actuators.

Still another object of the present invention is to provide an optical head which is so constructed that the mass will be concentrated on the supporting axis to prevent any unnecessary movements on the mechanical displacement at the time of the track control by the actuators.

Still another object of the present invention is to provide an optical head which is capable of high speed track controlling.

Still another object of the present invention is to provide an optical head which is thin in configuration.

Still another object of the present invention is to provide an optical head which is compatible with a multi-layer optical disk equipment.

Still another object of the present invention is to provide an optical head which facilitates axial alignment during the manufacturing processes.

Still another object of the present invention is to provide an optical head which is suitable for mass production.

CHARACTERISTICS OF THE INVENTION

The primary feature of the present invention lies in that the unit to be subjected to the track control is supported by a diaphragm.

The term "diaphragm" used herein denotes an elastic member which is:
 (1) a disk in shape,
 (2) formed with a void space between the center and the periphery,
 (3) provided with spring elements on its plane, the elements being connected with one another, (4) with the center portion being connected to the supporting or supported member while the peripheral portion is connected to the supported or supporting member respectively.

The second feature of the present invention lies in the structure that the actuator for the focus control is located outside the light beam which is perpendicular to the surface of the optical disk and in a manner to include a plane crossing the light beam.

DETAILED DESCRIPTION WITH REFERENCE TO THE DRAWINGS

In order to elucidate the features of the present invention, a detailed description including preferred embodiments is given hereinafter with reference to the accompanying drawings now briefly described.

Figure 1:
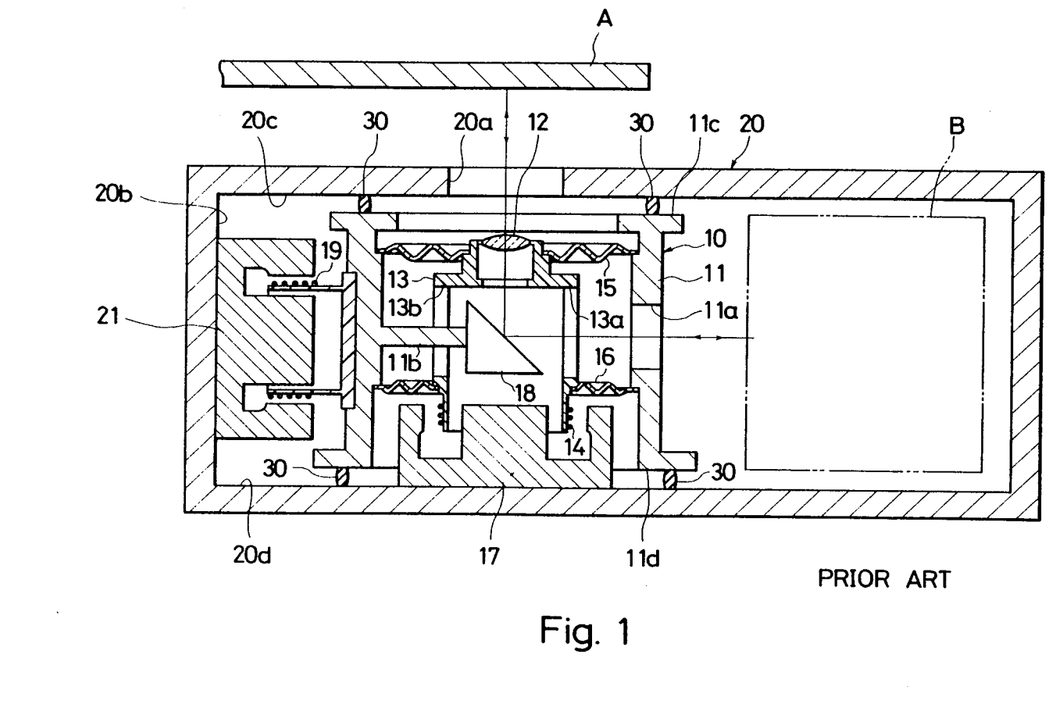
FIG. 1 is a sectional view to show the structure of an optical head according to the prior art.

Referring now to FIG. 1, the reference numeral 10 denotes an optical heat unit; 11 shell for the optical head unit 10 which is a hollow and square pillar in shape with a through-hole 11a formed on one side thereof; and 12 a focusing lens for focusing a parallel light beam onto the recording surface on an optical recording disk A. A movable cylindrical member 13 retains the focusing lens 12 at the upper part thereof and is provided with an electromagnetic coil 14 at the bottom and through-holes 13a and 13b on both sides thereof, through-holes 13a and 13b corresponding to or registering with through-hole 11a. Dampers 15 and 16 support the movable member 13 within the shell 11 in a manner to allow displacement only in the direction of the focus control. The reference numeral 17 denotes a magnet attached to the bottom of the shell 11 to constitute a first actuator together with the said electromagnetic coil 14 for driving the movable member 13 in the direction of the focus control. The reference numeral 18 indicates an optical path conversion means (a mirror) which is supported by an arm 11b which is projecting via the through-hole 13b into the movable member 13 from the inner wall of the shell 11 opposing the side formed with the through-hole 11a. Since mirror 18 deflects the optical path so that the light beam which enters into the movable member 13 via the through-holes 11a and 13a in parallel with the surface of the optical disk as well as the radial direction of the optical disk and in the direction of the track access will be oriented perpendicular to the surface of the optical disk. The mirror 18 further guides the light beam toward the disk A through the center of the focusing lens 12. The reference numeral 19 denotes an electromagnetic coil which is attached to the outer wall of the shell 11 on the side opposing the side provided with the through-hole 11a.

The reference numeral 20 denotes an outer shell of a hollow and rectangular shape to encase the optical head unit 10 of the above construction and has a through-hole 20a at a position corresponding to the focus lens 12. The reference numeral 21 denotes a magnet which is attached on the side wall 20b of the outer shell 20 for the head unit. Said magnet 21 together with said electromagnetic coil 19 constitute a second actuator for driving the optical head unit 10 in the direction of the track control. The reference numeral 30 indicates a support member, for example, a rubber spring; one end thereof is fixed to the upper face 11c and lower face 11d of the shell 11 while the other end to the inner wall of the upper plate 20c and the inner wall of the lower plate 20d respectively of the outer shell 20 for the head unit. The optical head unit 10 is supported movably in the direction of the track access (laterally in the figure) within the outer shell 20 by the aforementioned arrangement. The symbol B denotes an optical system for the head but its detail description is omitted herein since it is not directly relevant to the present invention.

In a head unit constructed as above, the outer shell 20 is track-accessed to a predetermined position on the disk A by means of a head positioner provided at a position (not shown). Further, when the parallel light beam for recording on or reproducing from disk A is emitted from the optical system B, the light beam enters into the movable member 13 via the through-hole 11a of the shell 11 and the through-hole 13a of the movable member 13. Whereupon, mirror 18 reflects the light beam at a normal angle so that the light beam will focus on the recording surface of the disk A after passing through the center of the focusing lens 12. For the focus control, a focus controlling signal is transmitted to the electromagnetic coil 14 from an external control circuit to cause magnetic action between said electromagnetic coil 14 and the magnet 17, thereby moving the movable member 13 vertically (in the drawing) with respect to the shell 11 via the dampers 15 and 16. For the required minute control in the direction of the track access, i.e., parallel to disk A, a track access controlling signal is transmitted to the electromagnetic coil 19 from the control circuit to cause the magnetic action between a magnet 21 and electromagnetic coil 19, thereby causing displacement of the optical head unit 10 in the direction of the track access with respect to the head outer shell 20 via the rubber spring 30.

The conventional optical heads as described above are advantageous in that they are thin, compact and light but they have the following defects. That is, since a rubber spring 30 is used as the supporting means for the shell 11 for the optical head unit 10 so as to move the shell 11 laterally by utilizing the elastic deformation of the rubber, the shell 11 is likely to move also in directions other than lateral, especially perpendicular thereto. This makes it difficult to stably detect the signals for the focus and the track controls by the reflected light from disk A. Moreover, uncontrollable vibration may occur during the positioner access and it has been heretofore difficult to attain a highly responsive equipment.

In order to overcome such difficulties, an attempt was made to use a metal plate spring in place of the rubber spring mentioned above. The support mechanism of such metal plate spring utilizes the torsion or deflection deformation of the metal to move the shell 11 laterally. In this case, since the rigidity of the spring in the direction other than the laterial direction can be made sufficiently greater than that in the lateral direction, it is possible to move the shell 11 stably only in the lateral direction. However, such metal plate spring, unlike a rubber spring, would be subject to what is known as a local resonance phenomenon where the surface of the plate spring would no longer vibrate as an integral part but different sections thereof would independently and freely vibrate when the frequency reaches a certain value. This made it difficult to obtain such a high performance in the track access as to enable recording and/or reproducing of video signals in the real time.

As to track control mechanisms for optical heads other than the one shown in FIG. 1, there has been known a structure where the focusing lens 12 alone is supported by means of a rubber or metal plate spring in a laterally movable manner. Mechanism of such construction was also defective in that uncontrollable vibration occurred during the positioner access or that detection of the control signal was extremely difficult, although control should be possible in principle. They were also defective because the optical system design would be strictly limited and complicated in its structural requirements.

On the other hand, if the parallel movement of the shell 11 could be made stably in the lateral direction in the optical head shown in FIG. 1, the incident light can be deflected at a normal angle by means of the mirror 18 without causing the position of the light reflected on the focusing lens to fluctuate. This permits the structural requirements for the optical system to be less strict. For these reasons, it has been strongly required to solve the above mentioned problem encountered in the conventional optical heads.

The inventors have conducted elaborate studies and experiments from various aspects and found that a spring member comprising plural spring elements having a planar extent and integrally forming a disk with the spring surface being on the same plane, and void portions being formed in between the center and the periphery of the disk (referred to as a diaphragm in this specification) has resilience which is stable only in one direction without unnecessary vibrating factors.

FIGS. 2 to 5 show the structure of the first embodiment according to the present invention. In these figures, the components of the optical head identical with those shown in FIG. 1 are represented by the same reference numbers. That is, the reference number 10 is the optical head, 11 a hollow and square shell which is formed as a pillar for the unit 10 having a through-hole 11a on one side thereof; 12 a focusing lens to focus parallel light beam on the recording surface of the optical recording disk not shown in the drawing; 13 a movable member cylindrical in shape and retaining the focus lens 12 at its top portion and provided with the electromagnetic coil 14 at its bottom portion and the through-holes 13a and 13b on its sides to correspond with the through-hole 11a. The reference numbers 15 and 16 denote the dampers which support the movable member 13 within the shell 11 in such a manner to allow displacement only in the direction of the focus control. The reference number 17 denotes a magnet attached to the lower portion of the shell 11, which, together with the said electromagnetic coil 14, constitutes the first actuator for driving the movable member 13 in the direction of the focus control. The reference numeral 18 denotes the optical path conversion means (a mirror) which is supported by the arm 11b projecting into the movable member 13 via the through-hole 13b from the inner wall of the shell 11 opposing the wall provided with the through-hole 11a. Said mirror 18 deflects at a normal angle the optical path of the light beam entering into the movable member 13 via the through-holes 11a and 13a in the direction of the track access which is parallel to the disk surface and guides the light beam through the center of the focus lens perpendicularly toward the optical disk. The reference numeral 19 denotes the electromagnetic coil 19 attached to the projection 11e located at a position opposite to the arm 11b of the shell 11.

Figure 2:
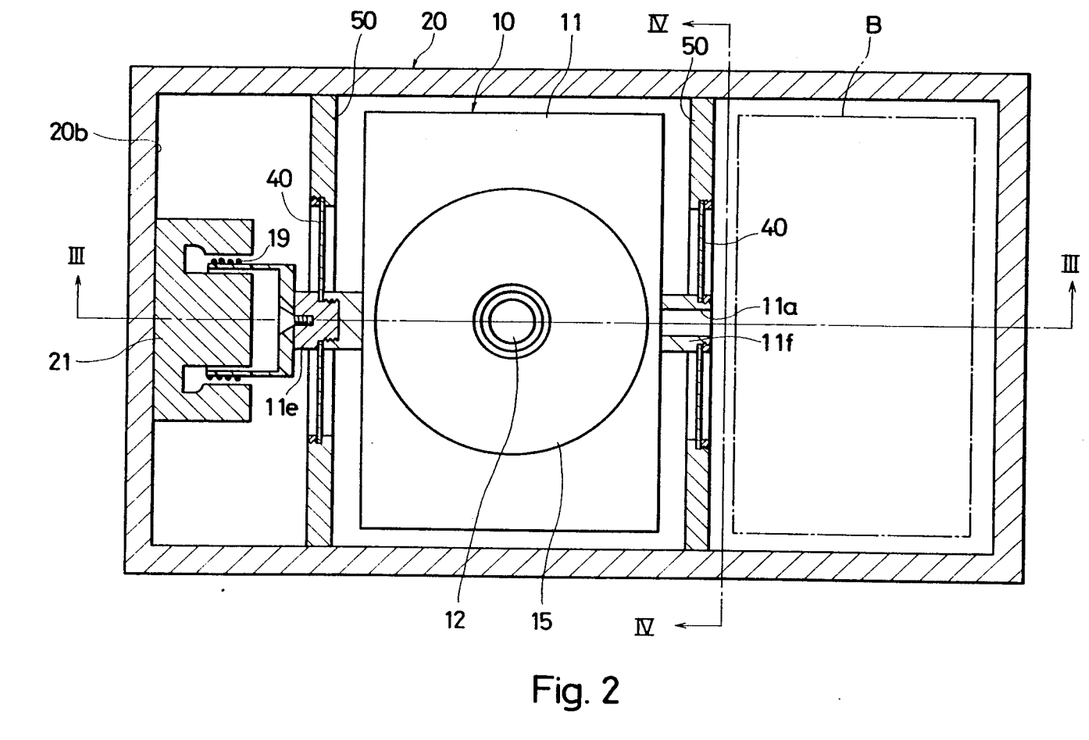
FIG. 2 is a sectional view of a first embodiment according to the present invention showing its structure.
Figure 3:
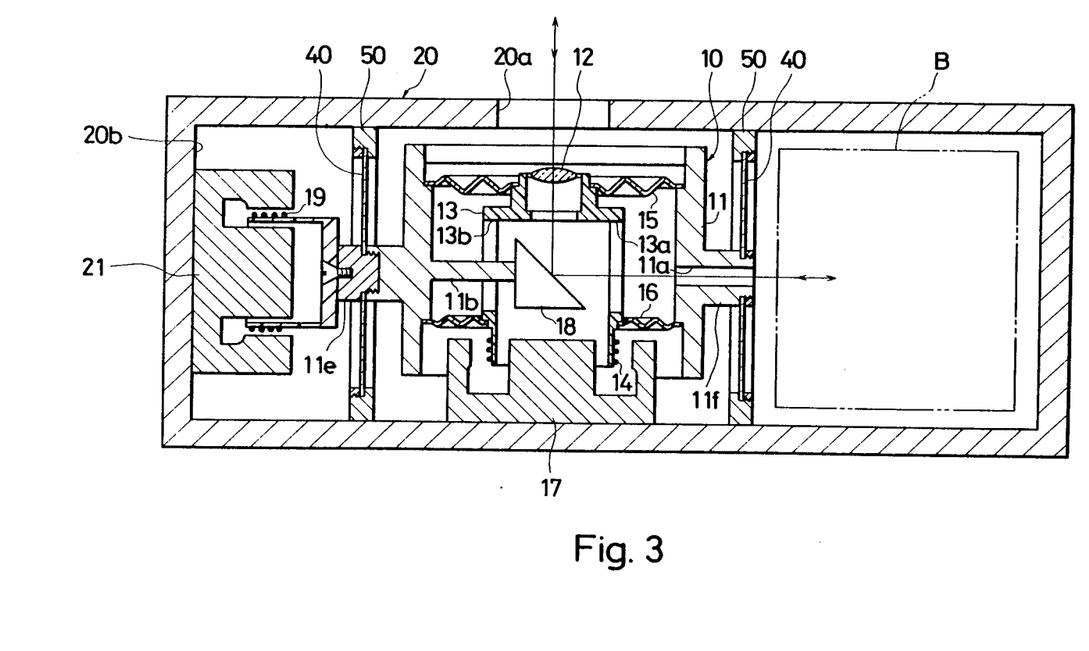
FIG. 3 is a sectional view along the line III—III in FIG. 2 viewed from the arrow.
Figure 4:
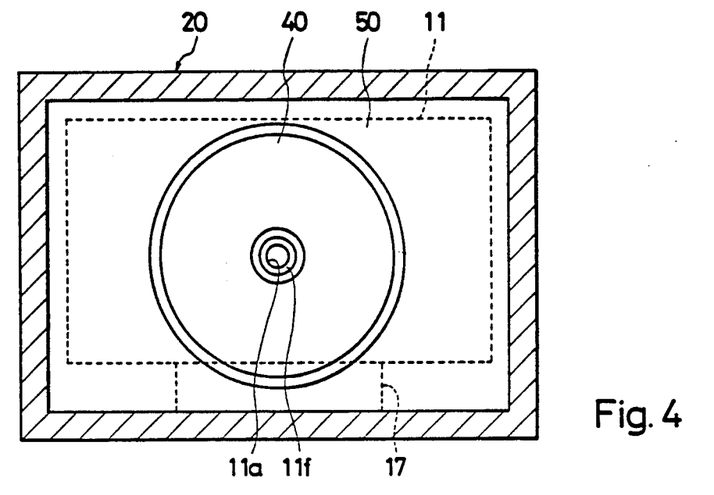
FIG. 4 is a sectional view along the line IV—IV in FIG. 2 viewed from the arrow.

The reference number 20 denotes the hollow rectangular shell for casing the optical head unit 10 of the above construction, and has a through-hole 20a at a position corresponding to the focus lens 12. The reference numeral 21 is the magnet attached to the side wall 20b of the outer shell 20 and said magnet 21 and the electromagnetic coil 19 constitute the second actuator for driving the optical head unit 10 in the direction of the track control.

Figure 5A:
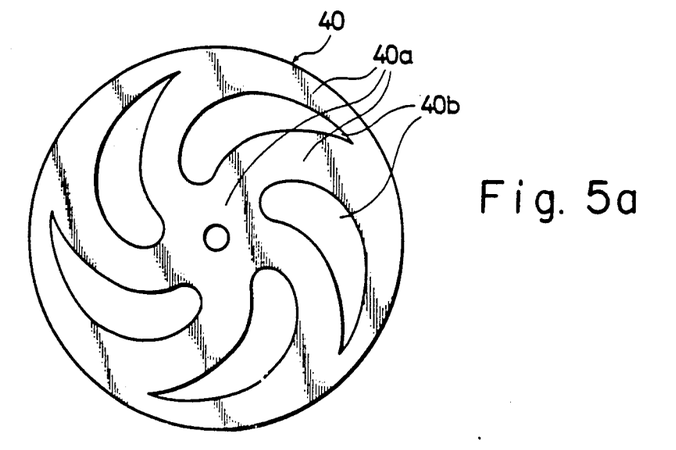
FIGS. 5(a) and (b) are plan views of two different diaphragm embodiments.
Figure 5B:
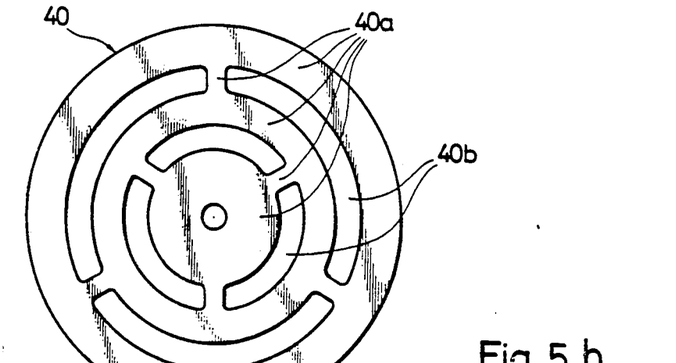

The present invention is characterized by the diaphragm 40 which functions as a supporting mechanism of the movable shell member 11. For example as shown in the two different embodiments of FIGS. 5(a) and (b), diaphragm 40 consists of plural spring elements 40a having a planar extent which integrally form a disk with the spring surface on the same plane, plural void portions or through-holes 40b being formed from the center to the outer periphery of the disk inbetween adjacent spring elements 40a. The diaphragm 40 is made of metal, for example, phosphor bronze, of 40 to 70 microns in thickness and is coated with a thin layer of rubber on it surface. A diaphragm 40 is positioned on each side of shell 11 with the light beam as the center axis which is in the direction of the track access parallel to the disk surface. The center of the diaphragms is fixed on the projections 11e and 11f of the shell 11 respectively and the periphery thereof is fixed to the frame 50 attached to the inner wall of the head outer shell 20. In this way, shell 11 is supported in such a manner as to allow its displacement only in the direction of the track access.

In the optical head unit of the above construction, the focus and the track access controls are identical with the case in the conventional optical head shown in FIG. 1 and, therefore, description of the controls is omitted. Instead, the features of the present invention will now be described in detail. As the diaphragm 40 is fixed as mentioned above with the center and the outer periphery thereof being the fixed ends and has no free end, excellent frequency characteristics of the spring without local resonance can be obtained and the track access control of the shell 11 becomes possible at a higher speed. Also, as the radial rigidity of the diaphragm 40 is sufficiently greater than the rigidity in the direction perpendicular to the spring surface, displacement of the shell 11 in the direction other than the driving direction can be prevented. The height of the shell 11 is determined by the size of the focus control mechanism including the focus lens 12, but if the shell is supported at its both sides as mentioned above, the supporting mechanism would no longer constitute a factor which increases the overall height of the optical head unit. It will thus be possible to realize an optical head which is thinner than the one shown in FIG. 1, providing an optical head suitable for multi-layer disk equipment.

Figure 6:
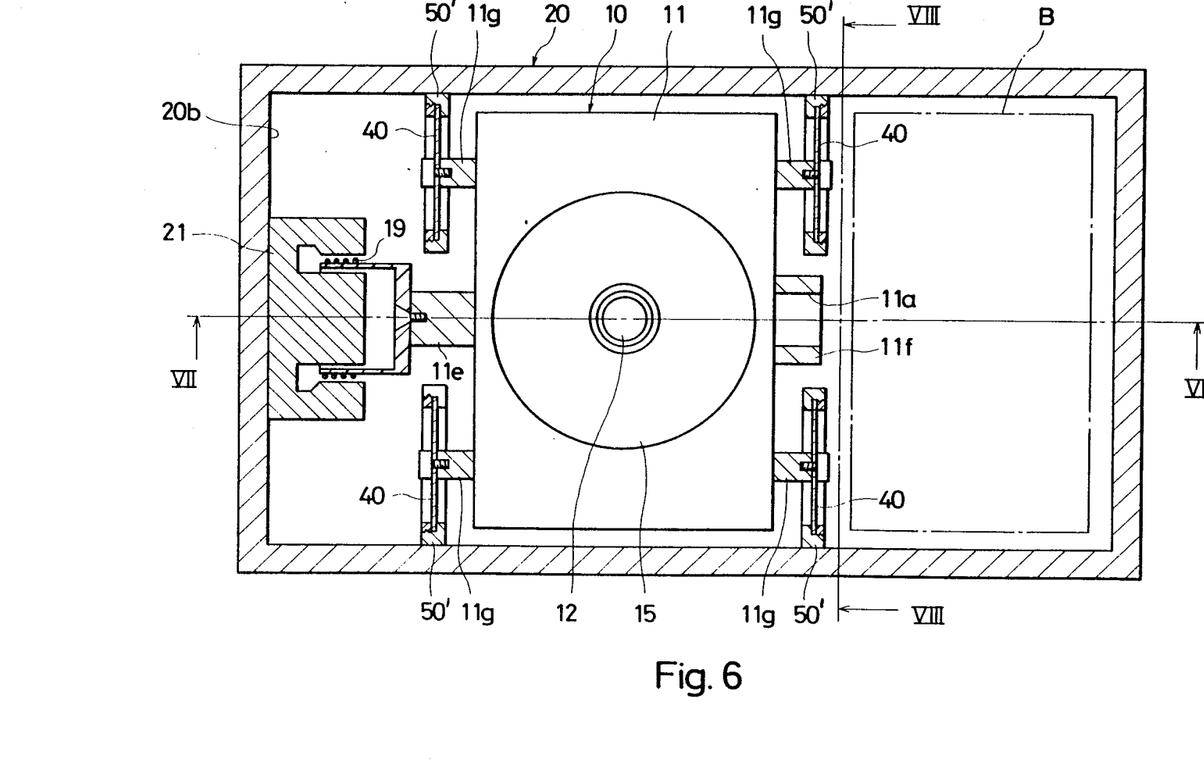
FIG. 6 shows the structure of a second embodiment according to the present invention in section.
Figure 7:
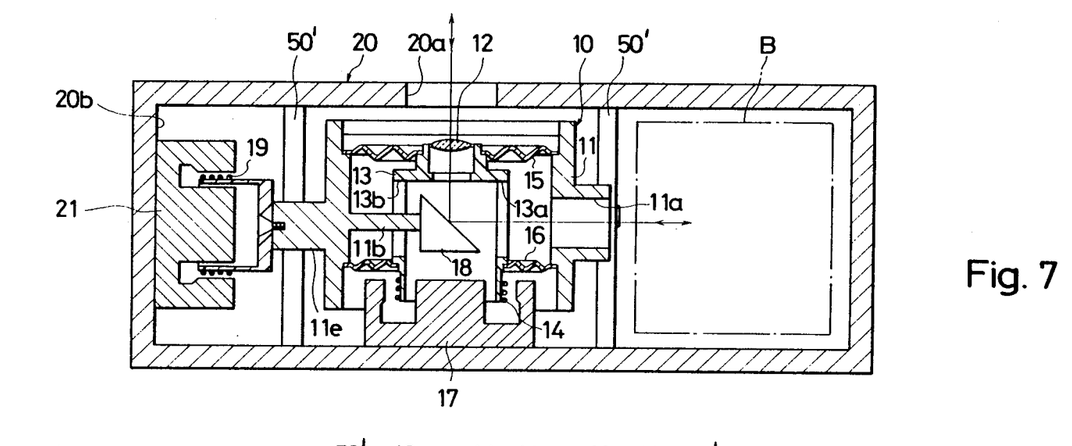
FIG. 7 is a sectional view along the line VII—VII in FIG. 6 viewed from the arrow.
Figure 8:
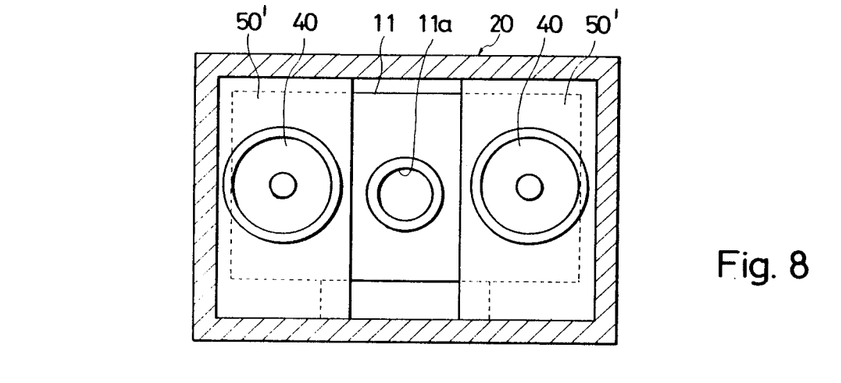
FIG. 8 is a sectional view along the line VIII—VIII in FIG. 6 viewed from the arrow.

FIGS. 6 through 8 show the structure of a second embodiment according to the present invention. The shell 11 in this embodiment is supported by four diaphragms 40 on two axes. The reference numeral 11g denotes supporting axles provided on the outer surface of the shell symmetrically with respect to the optical axis of the light beam emitted from the head optical system. The central portion of each diaphragm 40 is fixed to a respective supporting axle 11g while the outer periphery thereof is fixed to a respective frame piece 50' which is attached to the inner wall of the outer shell 20 for the head. This embodiment is particularly effective in preventing rotary displacement about the optical axis of the light beam emitted from the head optical system as well as about the axis perpendicular to the disk surface. Other features in construction and effects are the same as the first embodiment mentioned above.

Figure 9:
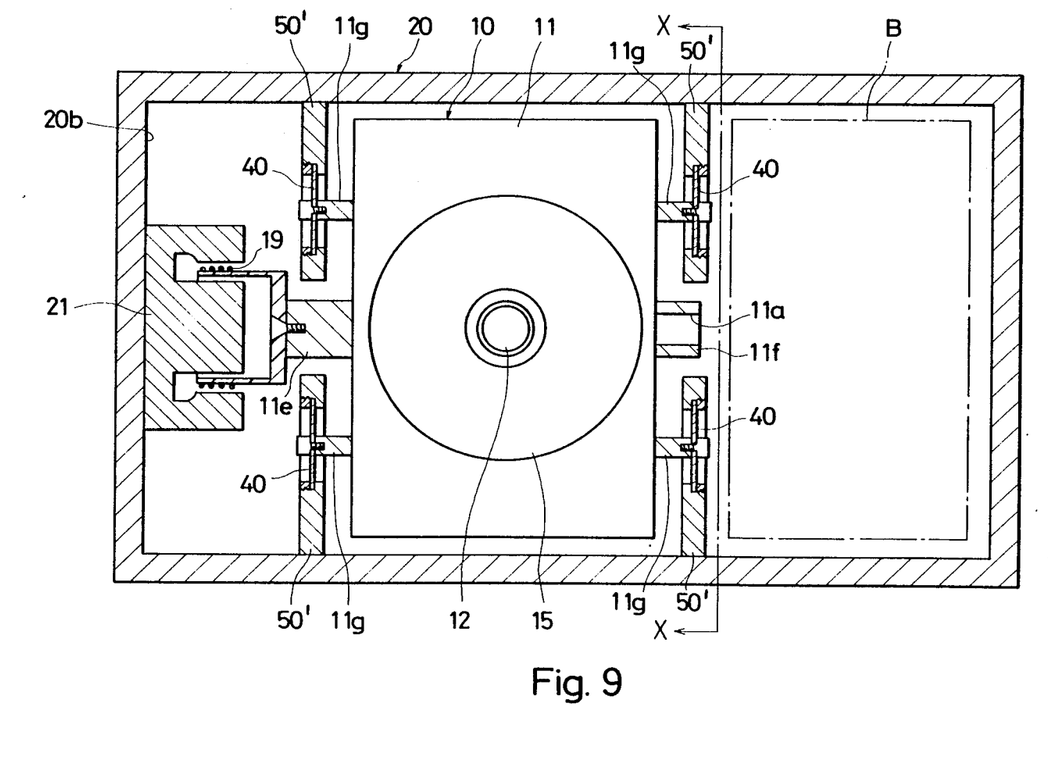
FIG. 9 is a sectional view of the third embodiment according to the present invention showing the structure.
Figure 10:
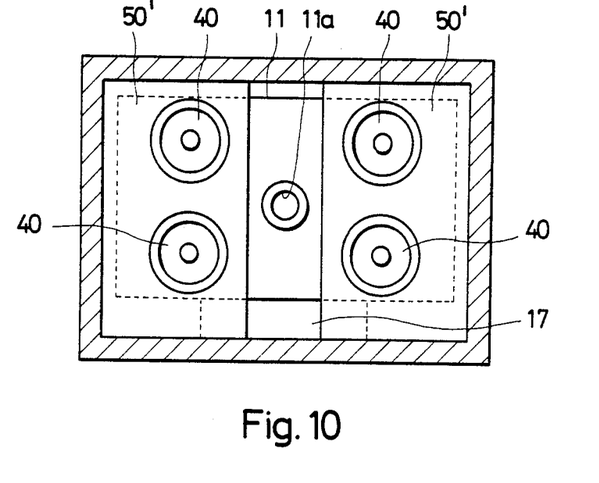
FIG. 10 is a sectional view along the line X—X viewed from the arrow indicated in FIG. 9.

FIGS. 9 and 10 show the third embodiment wherein four supporting axles identical with the one in the second embodiment are provided on both sides of the shell 11 in symmetry with the optical axis of the light beam as the center. Thus, the shell 11 is supported by eight diaphragms on four axes. When compared with the second embodiment, this embodiment is more effective in preventing the rotary displacement around the three axes of the movable member, i.e., the axes in the direction of track access and of the focus control and an axis perpendicular to said two axes. Other features in construction and effects are the same as those of the above described first embodiment.

Figure 11:
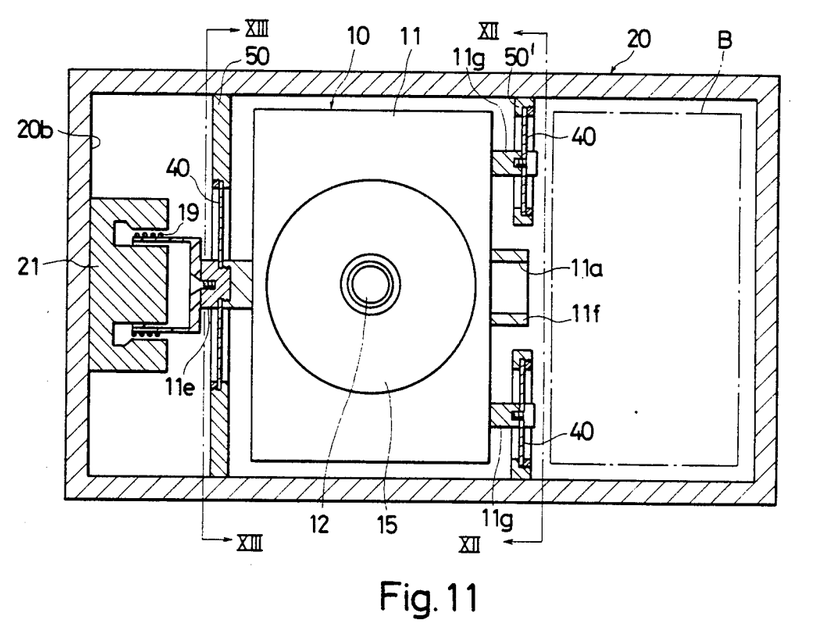
FIG. 11 is a sectional view of a fourth embodiment according to the present invention showing the structure.
Figure 12:
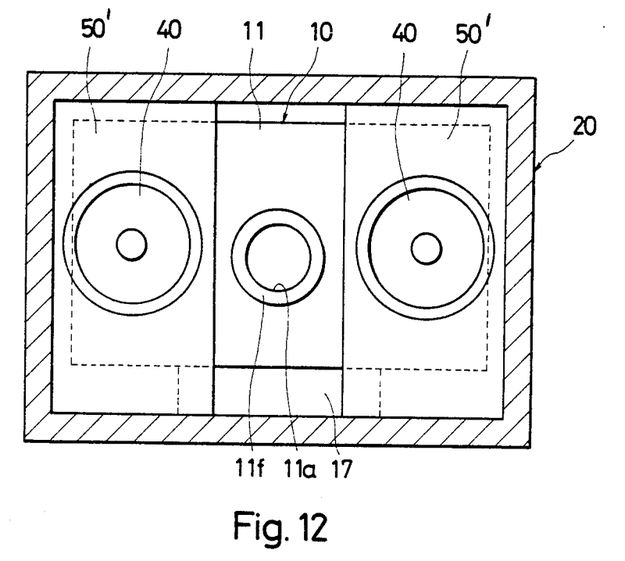
FIG. 12 is a sectional view along the line XII—XII in FIG. 11 viewed from the arrow.
Figure 13:
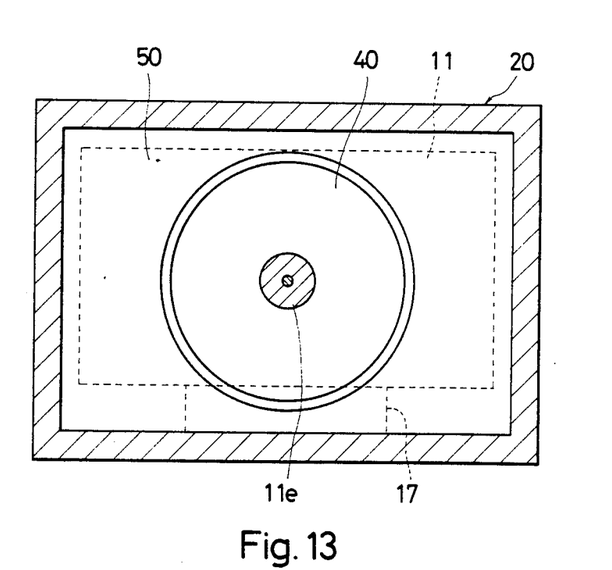
FIG. 13 is a sectional view along the line XIII—XIII in FIG. 11 viewed from the arrow.
Figure 14:
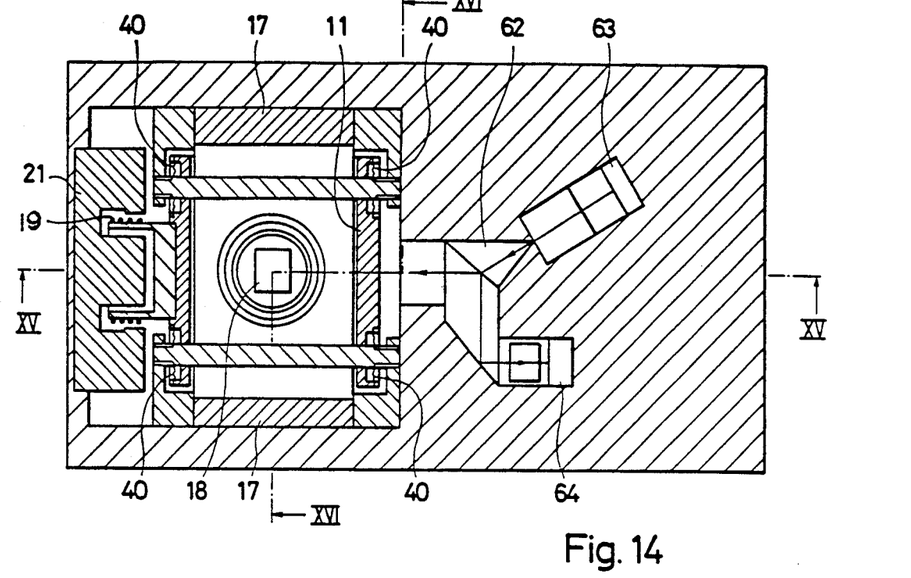
FIG. 14 is a sectional view of a fifth embodiment according to the present invention showing its structure along line XIV—XIV of FIG. 16.
Figure 15:
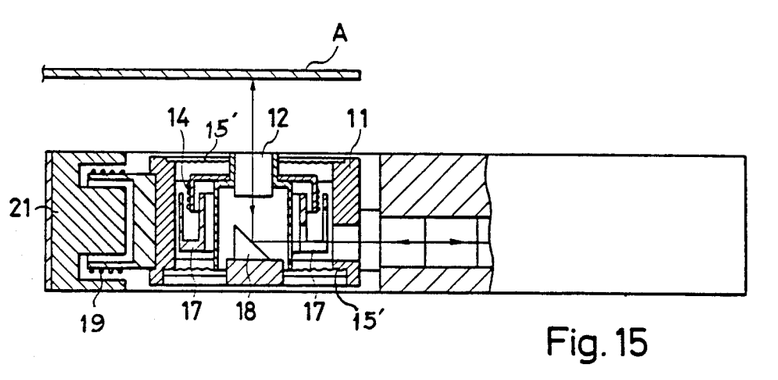
FIG. 15 is a sectional view along the line XV—XV in FIG. 14 viewed from the arrow.
Figure 16:
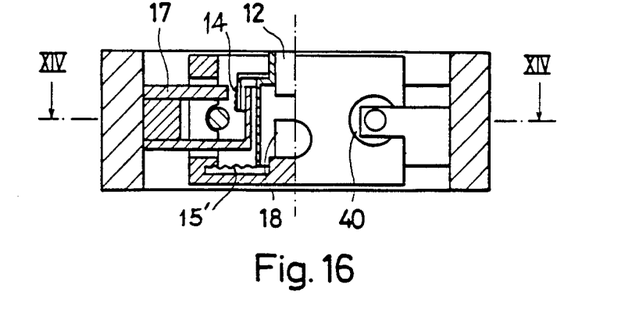
FIG. 16 is a sectional view along the line XVI—XVI in FIG. 14 viewed from the arrow.

FIGS. 11 through 13 show the structure of the fourth embodiment of this invention. In this embodiment, one of the sides of the shell 11 is supported by one diaphragm in the same manner as in the first embodiment while the other side of the shell 11 is supported by two diaphragms 40 in the same manner as in the second embodiment. When compared with the second and third embodiment, this fourth embodiment is capable of minimzing the rotary displacement about the movable member's three axes and at the same time of reducing the number of diaphgrams 40. Moreover, as the rigidity in the direction of driving can be made lower, it becomes possible to specify the requirments in the performance of the driving device. Other features in construction and effects are the same as those in the first embodiment mentioned above.

FIGS. 14 through 17 show the structure of the fifth embodiment according to the present invention. The shell 11 of this embodiment is supported by diaphragms 40 on its both sides and the embodiment incorporates the characteristics of the second embodiment. An actuator for controlling the focus is located on the side exterior to the optical path which is perpendicular to the optical disk. As can be seen from FIG. 15, the actuator for the focus control is provided with a magnet 17 and an electromagnetic coil 14 and is positioned outside the optical path between the focusing lens 12 and the optical path conversion means 18. When compared with the first through fourth embodiments mentioned above wherein the actuator is positioned below the optical path conversion means, the optical head in this embodiment can be made thinner as the actuator is positioned at the side. In the drawings, reference number 61 denotes a $\frac{1}{4}$ wave plate, 62 a deflective beam splitter, 63 a laser light source, 64 a photodetector, and 65 a position detector.

Figure 17:
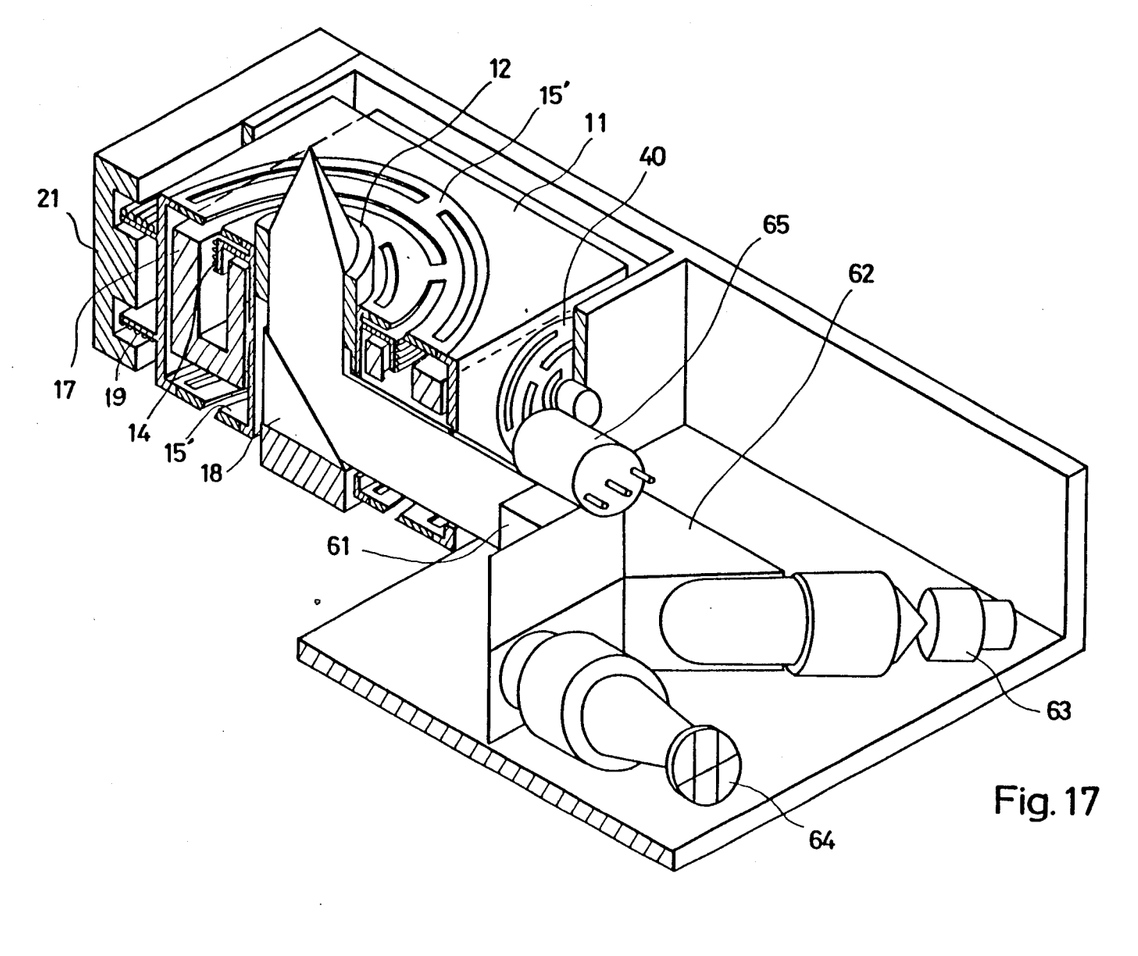
FIG. 17 is a partially exploded oblique view showing the structure of the fifth embodiment according to the present invention.

Further, in the fifth embodiment, as apparent in FIG. 17 a diaphragm 15' of the FIG. 5b type is used in the focus control mechanism as possible alternatives to the conventional dampers 15 and 16 in FIG. 1.

In the FIG. 17 embodiment, coil 14 must be thin enough not to interfere with the optical path. If more power is needed than such a thin coil can produce, the actuator must be made longer without intefering with the optical path.

As a combination of two major characteristics of the present invention enables the mass of the unit to be concentrated on the center axis of the unit and as the axis is to be supported, the rotation movement at the time of displacement becomes less likely to occur, thereby advantageously eliminating unnecessary displacement components. The two-axes support makes the overall structure thinner and easy for axial alignment. The structure is advantageous because it is high in machining precision and suitable for mass production.

Figure 18:
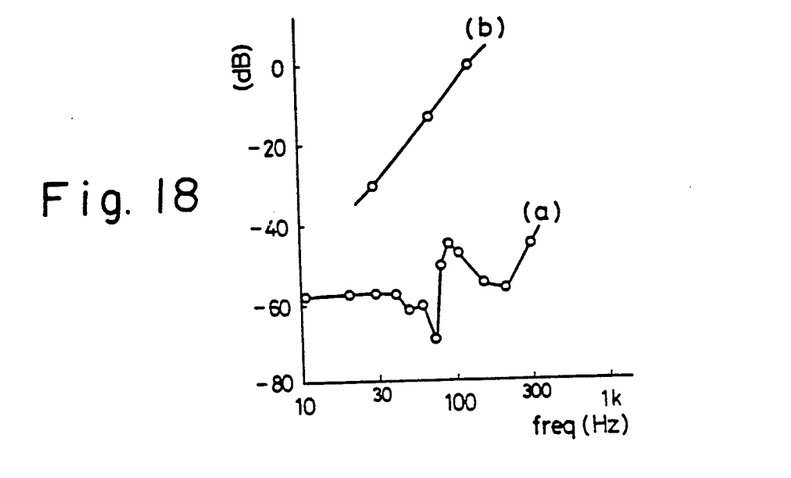
FIG. 18 shows the measurements on the displacement of the unit according to the present invention. In this embodiment, the unit is supported by four diaphragms on two axes. The figure compares the cases where (a) the diaphragm is used in the present invention and (b) a rubber member of the prior art is used.

Test results of the embodied equipment according to the present invention will now be given. FIG. 18 shows the measurements on displacement when the unit is driven by an actuator. The unit in this case is supported by four diaphragms on two axes. The abscissa represents the driving frequency and the ordinate the displacement in dB caused by driving, with the formula:

$$20 \log \frac{\text{perpendicular displacement (vertical direction)}}{\text{driving displacement (lateral direction)}}$$

The figure compares (a) the embodiment of the present invention with (b) the conventional equipment using a rubber spring. Since curve (a) is at least 20 dB lower than curve (b) at all of the frequencies as shown, it is apparent that the displacement in the undesired or perpendicular (vertical) direction can be reduced to at least about 1/10 and the displacement in the desirable (parallel or lateral) direction alone can be achieved by the present invention.

Figure 19A:
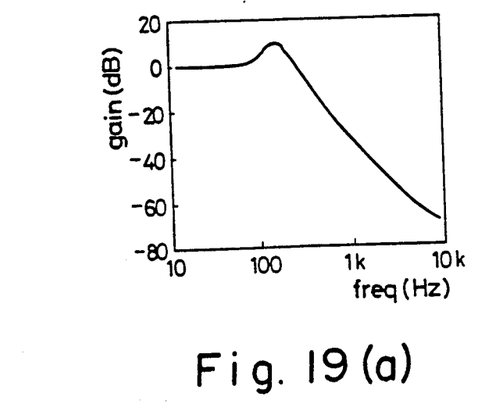
FIGS. 19(a) and (b) show the resonance characteristics of the elastic members for comparison: (a) the diaphragm used in the present invention; (b) a plate spring employed in the conventional equipment.
Figure 19B:
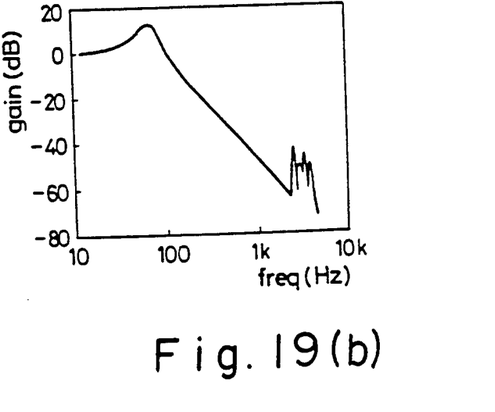

FIGS. 19(a) and 19(b) show the measurements on the resonance of the springs, comparing in FIG. 19(a) the diaphragm used in the present invention with FIG. 19(b) the plate spring in the conventional equipments. Whereas resonance occurs at several kHz in the plate spring, the diaphragm is free from the resonance of such a higher frequency.

The table below shows the result of measurement on pitching of the unit.

TABLE

| Pitching of the Shell Body | |
| --- | --- |
| Mode of support: | Frequency |
| Two diaphragms on one axis: | 2.0 k Hz |
| Four diaphragms on two axes: | 6.025 k Hz |
| Eight diaphragms on four axes: | 6.05 k Hz |

I claim:

1. An optical head arrangement for use with an optical disk, comprising
    an optical head unit including a lens system for focusing a light beam received from a given direction onto a recording surface of said optical disk, a focus control mechanism for focal adjustment of said lens system in said given direction relative to said unit and optical path conversion means fixed to said unit in the optical path of said light beam for changing the optical path to said given direction from a direction substantially parallel to said disk surface,
    a housing containing said unit and having unit supporting means for mounting said unit movably in said parallel direction only,
    said supporting means including at least two supporting diaphragms disposed in said given direction on opposite sides of said unit, each diaphgram having an outer portion and a center portion with one of said portions being connected to said housing and the other to said unit, each diaphgram further having in its plane between said portions a plurality of interconnected planar spring elements with slots inbetween, and
    control means for controlling the positions of said unit relative to said housing in said parallel direction for track control as to said disk and without causing, due to the presence of said diaphragm, any significant displacement of said unit in said given direction,
    wherein said supporting means includes at least two spaced supporting diaphragms on at least one of said sides.

2. An arrangement as in claim 1 wherein said supporting means includes at least two spaced supporting diaphragms on both of said sides.

3. An arrangement as in claim 1 wherein said housing has a pair of walls on opposite sides of said unit and said optical path in its parallel direction extends through one of said walls, one of said diaphragms being positioned between the other of said walls and said housing.

4. An arrangement as in claim 1 wherein said slots are arranged in spaced sectors of concentric circles.

5. An arrangement as in claim 1 wherein said slots are of curved tear drop shape.

6. An arrangement as in claim 1 wherein said focus control mechanism provides a light beam substantially perpendicular to the surface of the optical disk and an actuator for the focus control mechanism is located at a position which includes the plane which is normal to the said perpendicular light beam.

7. An optical head arrangement for use with an optical disk, comprising
    an optical head unit including a lens system for focusing a light beam received from a given direction onto a recording surface of said optical disk, a focus control mechanism for focal adjustment of said lens system in said given direction relative to said unit and optical path conversion means fixed to said unit in the optical path of said light beam for changing the optical path to said given direction from a direction substantially parallel to said disk surface,
    a housing containing said unit and having unit supporting means for mounting said unit movably in said parallel direction only,
    said supporting means including four supporting diaphragms disposed in said given direction on opposite sides of said unit, each diaphragm having an outer portion and a center portion with one of said portions being connected to said housing and the other to said unit, each diaphragm further having in its plane between said portions a plurality of interconnected planar spring elements with slots inbetween, and
    control means for controlling the positions of said unit relative to said housing in said parallel direction for track control as to said disk and without causing, due to the presence of said diaphragm, any significant displacement of said unit in said given direction,
    said four diaphragms being each fixed on two a

* * * * *